US010719709B2

(12) United States Patent
Zemenchik

(10) Patent No.: US 10,719,709 B2
(45) Date of Patent: *Jul. 21, 2020

(54) AUGMENTED REALITY FOR PLANT STAND MANAGEMENT

(71) Applicant: CNH Industrial America LLC, New Holland, PA (US)

(72) Inventor: Robert A. Zemenchik, Kenosha, WI (US)

(73) Assignee: CNH Industrial America LLC, New Holland, PA (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/946,969

(22) Filed: Apr. 6, 2018

(65) Prior Publication Data
US 2019/0311198 A1 Oct. 10, 2019

(51) Int. Cl.
*G06K 9/00* (2006.01)
*G06T 19/00* (2011.01)
*G06T 7/90* (2017.01)
*A01M 7/00* (2006.01)
*G06T 7/00* (2017.01)
*A01D 34/00* (2006.01)

(52) U.S. Cl.
CPC ........ *G06K 9/00657* (2013.01); *G06T 19/006* (2013.01); *A01D 34/008* (2013.01); *A01M 7/0089* (2013.01); *G06T 7/0002* (2013.01); *G06T 7/90* (2017.01); *G06T 2207/10024* (2013.01)

(58) Field of Classification Search
CPC ..... G06K 9/00657; G06T 19/006; G06T 7/90; G06T 7/0002; G06T 2207/10024; A01D 34/008; A01M 7/0089
See application file for complete search history.

(56) References Cited

U.S. PATENT DOCUMENTS

| 6,064,943 | A  | 5/2000 | Clark, Jr. et al. |
| 6,212,824 | B1 | 4/2001 | Orr et al. |
| 6,751,576 | B2 | 6/2004 | Hall et al. |
| 6,880,291 | B2 | 4/2005 | Raun et al. |
| 7,081,611 | B2 * | 7/2006 | Scott .................... A01B 79/005 239/155 |

(Continued)

OTHER PUBLICATIONS

"Non-Contact Plant Growth Measurement Method and System Based on Ubiquitous Sensor Network Technologies", Jinweon Suk, Seokhoon Kim and Intae Ryoo, Sensors 2011, 11, 4312-4334, in revised form: Mar. 14, 2011/Accepted: Apr. 12, 2011/Published: Apr. 13, 2011 (23 pages).

*Primary Examiner* — Santiago Garcia
(74) *Attorney, Agent, or Firm* — Rebecca L. Henkel; Rickard K. DeMille

(57) ABSTRACT

A plant stand management system includes a sensor unit configured to capture images of a plant stand, an applicator, and a controller communicatively coupled to the sensor unit and the applicator. The controller is configured to receive the captured images, process the captured images for determining one or more characteristics of the plant stand, generate one or more control signals based on the one or more characteristics, and send the one or more control signals to the applicator. The applicator is configured to perform at least one action on the plant stand based on the one or more control signals.

27 Claims, 7 Drawing Sheets

(56) References Cited

U.S. PATENT DOCUMENTS

| | | | |
|---|---|---|---|
| 7,099,004 B2* | 8/2006 | Masten | A01M 7/0089 356/328 |
| 7,263,210 B2* | 8/2007 | Kummel | A01M 7/0089 382/110 |
| 9,382,003 B2* | 7/2016 | Burema | A01B 79/005 |
| 9,622,485 B2 | 4/2017 | von Maltzahn et al. | |
| 9,652,840 B1 | 5/2017 | Shriver et al. | |
| 9,719,147 B1 | 8/2017 | Fernandez | |
| 9,811,764 B2 | 11/2017 | Fryshman | |
| 2001/0016053 A1 | 8/2001 | Dickson et al. | |
| 2011/0125477 A1 | 5/2011 | Lightner et al. | |
| 2017/0049043 A1* | 2/2017 | Muff | A01C 23/023 |
| 2017/0122742 A1* | 5/2017 | Schleicher | A01B 69/008 |
| 2017/0374323 A1* | 12/2017 | Gornik | G06T 7/0004 |
| 2018/0035611 A1* | 2/2018 | D'Arrigo | A01D 45/263 |
| 2018/0111148 A1* | 4/2018 | Batcheller | A01M 7/0042 |
| 2018/0121726 A1* | 5/2018 | Redden | A01G 22/00 |
| 2018/0137357 A1* | 5/2018 | Margalit | G06K 9/2018 |
| 2019/0124910 A1* | 5/2019 | Anderson | A01H 1/04 |
| 2019/0128864 A1* | 5/2019 | Pickett | A01M 7/0089 |
| 2019/0150357 A1* | 5/2019 | Wu | A01C 21/00 |
| 2019/0278988 A1* | 9/2019 | Papanikolopoulos | G06K 9/6223 |

* cited by examiner

AUGMENTED REALITY FOR PLANT STAND MANAGEMENT

FIELD OF THE INVENTION

The present invention relates to plant stand management and, more particularly, to augmented reality for plant stand management.

BACKGROUND OF THE INVENTION

Late or out of place corn plants rarely produce an economical return in modern corn production. As a result, farmers invest heavily in planter technologies designed to increase the number of plants expected to produce a fully developed ear, as a percentage of the total plants that emerge. For example, if a farmer plants 34,000 seeds per acre, he expects (based on the pure live seed rating of his seed lot) at least 95% of the seeds to produce an emerging seedling. Until electronic innovations in planter row units became commercially available, data typically showed that perhaps only 80-90% of those emerging plants would produce a uniform and timely seedling under average conditions. Expressed as a percentage, this is referred to in the industry as the Net Effective Stand % (NES). Planter improvements have increased NES to perhaps 90% or more, removing approximately half of the non-effective plants. That still leaves approximately (conservatively) at least 5% of the plants as non-effective. In a stand of 34,000, this would represent 1700 or more plants that are in effect, weeds.

In other words, every 1% improvement in NES stands results in approximately 300 plants per acre, or over 2 bushels/acre, which on 80 million acres results in a gross benefit of 160 million bushels of corn, or nearly $0.5 B in revenue.

However, determining the location of such underperforming plants remains elusive, since they can be virtually anywhere within the stand. The task of finding them manually is costly and unrealistic. For example, evaluating plant stands such as corn have up until recently required manual counting and visual characterization by an agronomist or trained practitioner. In fact, such an evaluation is only conducted on an infrequent basis, and even then, only with small subsamples within a given field. More recently, unmanned aerial vehicles have developed camera technologies and applications to count individual plants, however, such technology has been unable to detect and/or quantify characteristics of individual plants. The remaining non-effective members of the population in the field therefore consume resources without the desired outcome.

What is needed in the art is a system and method for determining characteristics of individual plants, newly emergent and during the growing season, in an automated and efficient manner, then subsequently managing the plant stand, thereby optimizing the NES and harvest for the entire population.

SUMMARY OF THE INVENTION

In accordance with an aspect of the present invention, there is provided a system including an agricultural vehicle, and a plant stand management system mounted to the agricultural vehicle. The plant stand management system includes at least one sensor unit configured to capture images of a plant stand, at least one applicator, and a controller communicatively coupled to the at least one sensor unit and the at least one applicator. The controller is configured to receive the captured images, process the captured images for determining one or more characteristics of the plant stand, generate one or more control signals based on the one or more characteristics, and send the one or more control signals to the at least one applicator. Then at least one applicator is configured to perform at least one action on the plant stand based on the one or more control signals.

In accordance with another aspect of the present invention, a plant stand management system for use in an agricultural vehicle traversing a plant stand includes at least one sensor unit configured to capture images of the plant stand, at least one applicator, and a controller electrically coupled to the at least one sensor unit and the at least one applicator. The controller is configured to receive the captured images, process the captured images for determining one or more characteristics of the plant stand, generate one or more control signals based on the one or more characteristics, and send the one or more control signals to the at least one applicator. Then at least one applicator is configured to perform at least one action on the plant stand based on the one or more control signals.

In accordance with another aspect of the present invention, a method for plant stand management includes capturing, by at least one sensor unit, images of a plant stand, receiving, by a controller, the captured images, processing, by the controller, the captured images for determining one or more characteristics of the plant stand, generating, by the controller, one or more control signals based on the one or more characteristics, sending, by the controller, the one or more control signals to at least one applicator, and performing, by the at least one applicator, at least one action on the plant stand based on the one or more control signals.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
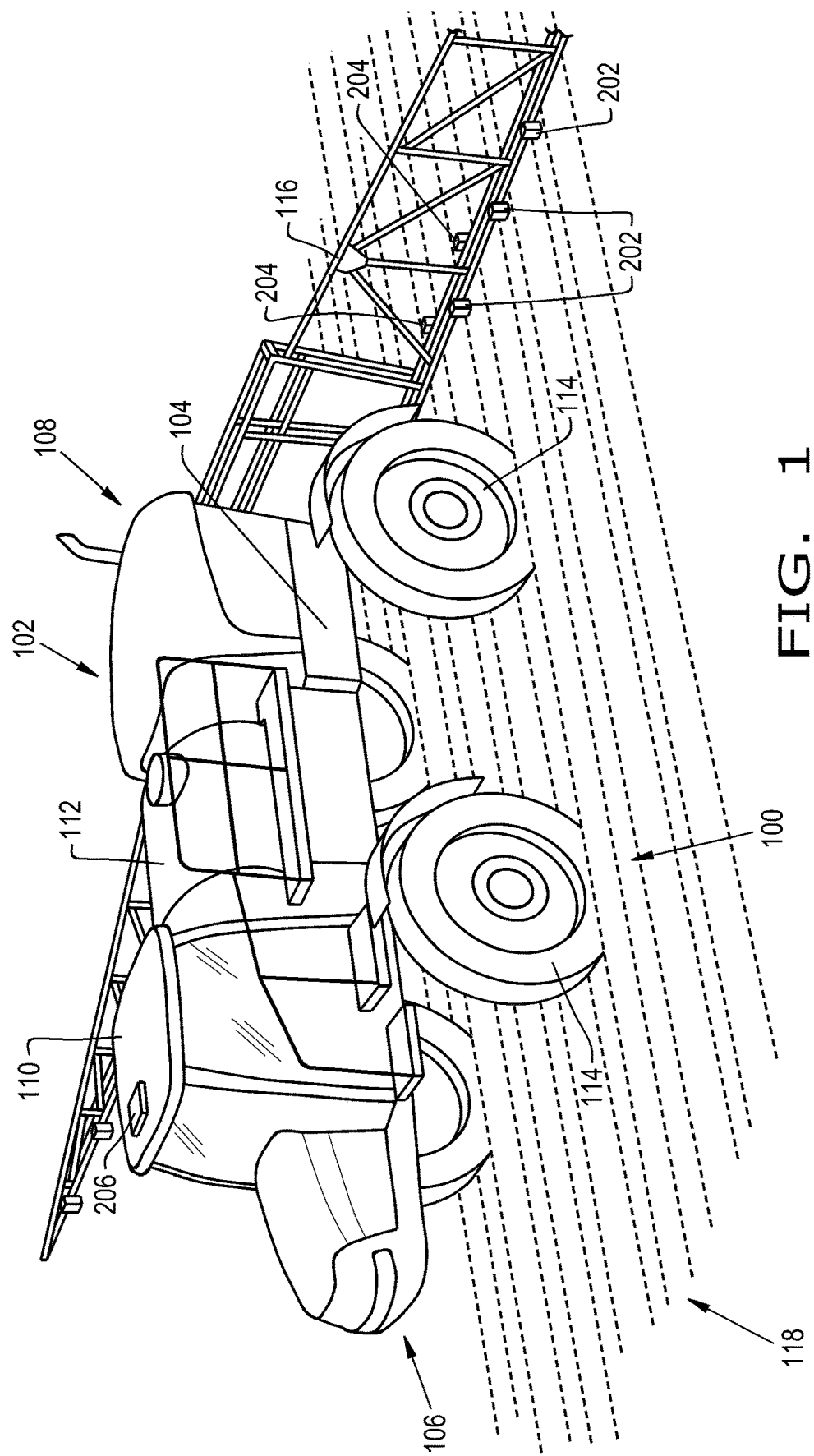
FIG. 1 is a perspective view of a system including an agricultural vehicle and a plant management system, formed in accordance with an embodiment of the present invention.
Figure 2:
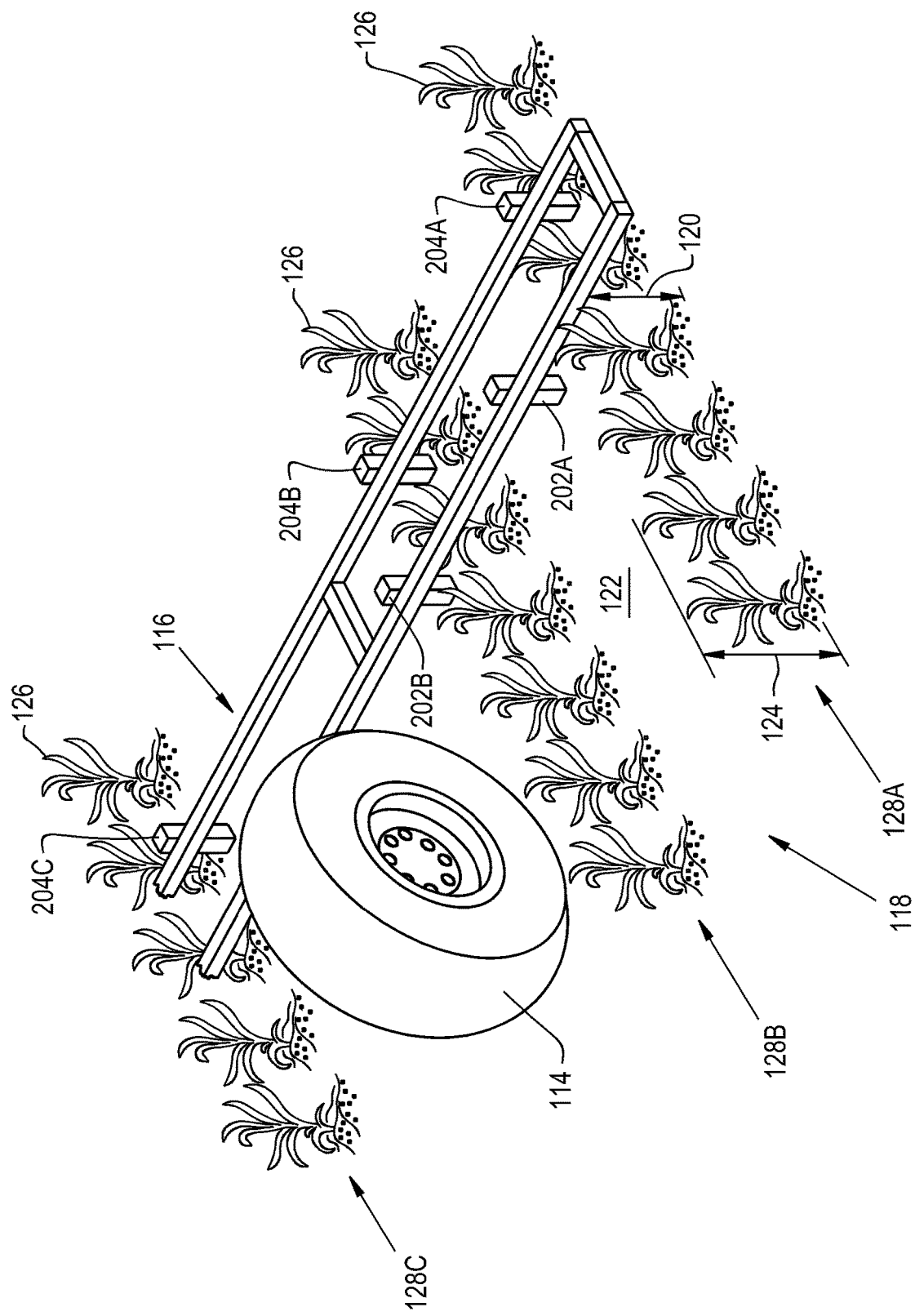
FIG. 2 is a perspective view of a rear portion of the system of FIG. 1, formed in accordance with an embodiment of the present invention.
Figure 3:
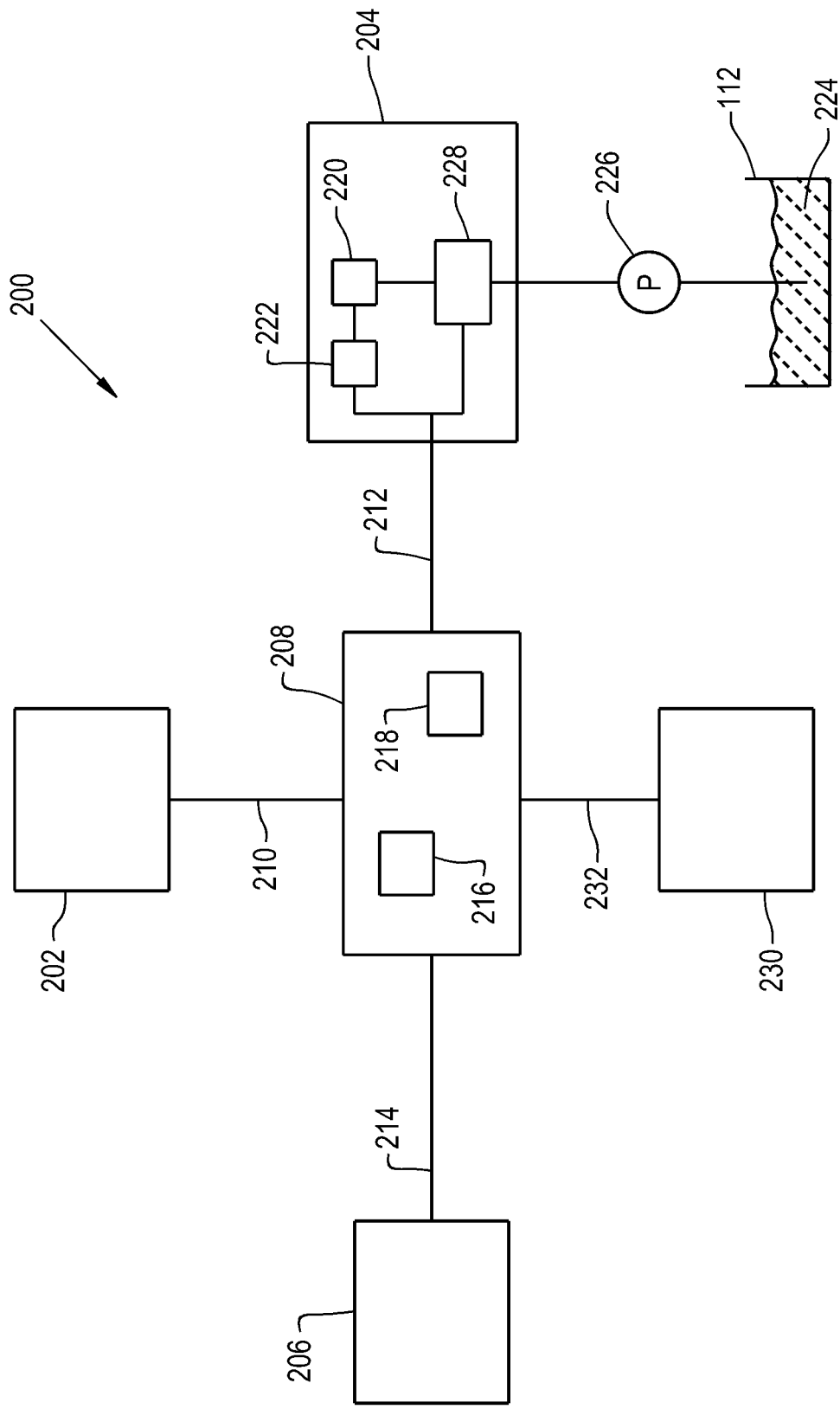
FIG. 3 shows components of the plant management system of FIG. 1, formed in accordance with an embodiment of the present invention.

Referring now to the drawings, and more particularly to FIGS. 1-3, a system 100 formed in accordance with an embodiment of the present invention is shown. The system 100 includes an agricultural vehicle 102 including a chassis 104 having a front portion 106 and a back portion 108. The vehicle 102 includes a cab 110 mounted to the chassis 104, a storage container 112 mounted to the chassis 104, and wheels 114 mounted to the chassis 104. In the embodiment shown, the vehicle 102 also includes a boom 116 mounted to the back portion 108 of the chassis 104, although the scope of the invention covers the boom 116 mounted to the front portion 106 of the chassis 104. In one embodiment of the invention, the boom 116 is a conventional boom used in conjunction with applying agents, such as herbicides, pesticides, insecticides, fungicides and fertilizers, to a plant stand 118. The agents may include plant and soil agents. The plant stand 118 may be a corn plant stand, however, the scope of the present invention covers all types of plants, and particularly, all types of crops, at all stages of growth.

By way of exemplary embodiments, the agricultural vehicle 102 may be a Case IH Patriot® sprayer or a New Holland Guardian® sprayer, however, the scope of the present invention covers all types of agricultural vehicles capable of being fitted for applying an agent to, or performing an action on, plants of a plant stand either individually or collectively, and/or to soil of a plant stand, including for example, planters, sprayers, harvesters, tractors and trucks, including pickup trucks.

The system 100 also includes a plant stand management system 200 mounted to the agricultural vehicle 102. In one embodiment, the plant stand management system 200 includes at least one sensor unit 202 mounted to the boom 116, at least one applicator 204 mounted to the boom 116, at least one optional GPS device 206 mounted to the cab 110, and a controller 208 mounted to the cab 110, however, in other embodiments the sensor unit 202 may be mounted anywhere on the agricultural vehicle 102 and/or the GPS device 206 may be mounted anywhere on the agricultural vehicle 102 or on the boom 116. The controller 208 is communicatively coupled to the sensor unit 202, the applicator 204, and the GPS device 206 via cables 210, 212, 214, such as Ethernet coaxial cables forming a LAN, or wirelessly via a WLAN, for example.

An operator or an automated control system (not shown) of the vehicle 102 may adjust a height 120 of the boom 116 above a surface 122 of the plant stand 118 via, for example, a hydraulic system, based at least in part on a height 124 (or average height) of plants 126 of the plant stand 118, conditions of the plant stand 118 or the surface 122 of the plant stand 118, conditions of the soil of the plant stand 118, settings of the sensor unit 202 and/or the applicator 204, and/or on environmental conditions (e.g., wind, humidity and/or other ambient conditions).

In one embodiment of the invention, the sensor unit 202 is a camera configured to capture images of the plant stand 118. By way of an exemplary embodiment, the camera may be a high-speed digital camera such as the EoSens® configured to capture 80-80,000 digital frames (i.e. digital images) per second with a maximum resolution of 1,280 by 1,024 pixels.

Figure 4A:
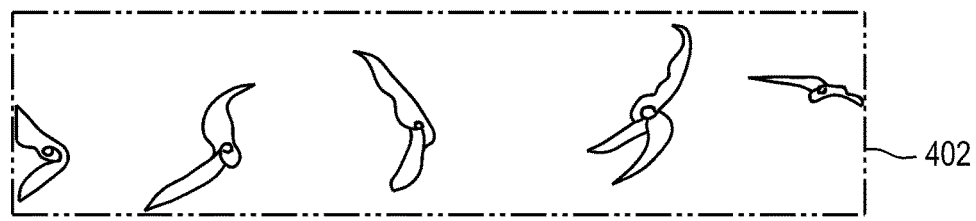
FIG. 4A shows a first image captured by a sensor unit of the plant management system of FIG. 3, formed in accordance with an embodiment of the present invention.
Figure 4B:
FIG. 4B shows a processed image generated from the first image of FIG. 4A, formed in accordance with an embodiment of the present invention.

In one embodiment of the invention, each of the sensor units 202 are mounted to the boom 116 such that each sensor unit 202 is positioned above a corresponding row 128 of the plant stand 118 when the wheels 114 of the vehicle 102 are positioned between adjacent rows, e.g., rows 128B, 128C, for traveling parallel to the rows 128. For example, FIG. 4A shows an image 402 captured by the sensor unit 202B positioned above the row 128B, taken in a direction of the surface 122 of the plant stand 118. As will be discussed in more detail further below, FIG. 4B shows a processed image 404, generated via application of image-processing software to the captured image 402.

Figure 5:
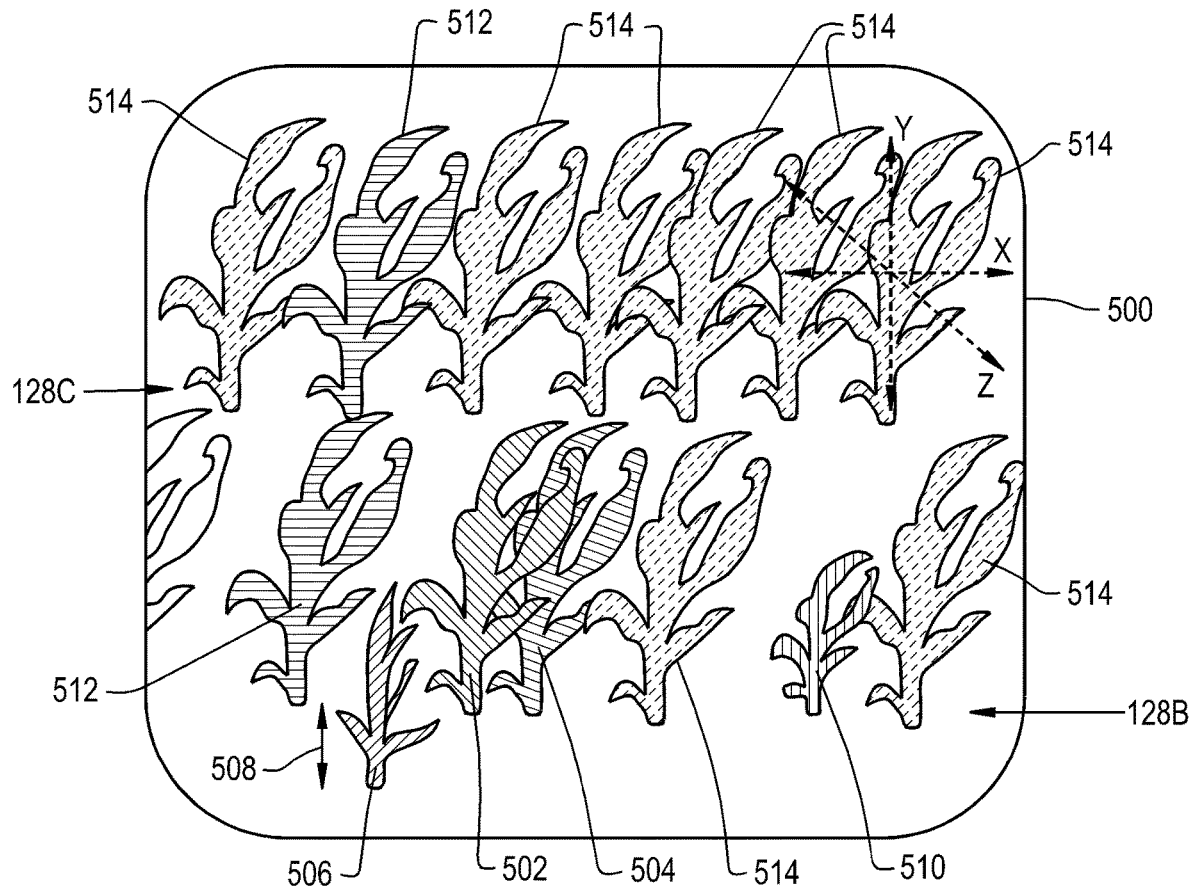
FIG. 5 shows an AR image generated from a second image captured by a sensor unit of the plant management system of FIG. 3, formed in accordance with an embodiment of the present invention.

In another embodiment of the invention, each of the sensor units 202 are mounted to the boom 116 such that each sensor unit 202 is positioned between adjacent rows, e.g., rows 128A and 128B, of the plant stand 118 when the wheels 114 of the vehicle 102 are positioned between adjacent rows, e.g., rows 128B and 128C, for traveling parallel to the rows 128. By way of an exemplary embodiment, FIG. 5 shows a processed image 500, generated from an image captured by the sensor unit 202 positioned between two adjacent rows, e.g., rows 128A and 128B, taken in a direction perpendicular to the rows 128, showing processed images of plants 126 planted in rows 128B and 128C.

The applicator 204 may be mounted to the boom 116 such that each applicator 204, e.g., applicator 204A, is positioned above a row, e.g., row 128A, for applying an agent to locations of targeted plants associated with the row 128A, when the wheels 114 of the vehicle 102 are positioned between adjacent rows, e.g., rows 128B and 128C, for traveling parallel to the rows 128. However, the scope of the invention covers the applicator 204 mounted between adjacent rows for applying the agent to locations of targeted plants belonging to at least one of the two adjacent rows. In one embodiment, the sensor units 202 are mounted to positions on the boom 116 that are forward (i.e., positioned closer to the front portion 106 of the vehicle 102) of positions on the boom 116 to which the applicators 204 are mounted. By way of an exemplary embodiment, for vehicle 102 speeds of 10 mph, if the sensor units 202 are mounted to positions on the boom 116 that are approximately 18 inches forward of positions on the boom 116 to which the applicators 204 are mounted, and for plants 126 in a row 128 that are spaced 6 inches apart, the controller 208 will have up to a few tenths of a second to process the captured images and generate control signals for activating the applicators 204. However, based upon the processing speed of the controller 208 and the speed of the vehicle, embodiments of the present invention include different distances in the forward direction between the sensor units 202 and the applicators 204.

In an embodiment of the present invention, the controller 306 may include a processor 216, e.g., a microcontroller or a CPU, and a memory 218. The processor 216 is configured to receive the images, e.g., image 402, captured by the one or more sensor units 202, either directly from the sensor units 202 in real-time, or from the memory 218 or buffer (not shown) in which the captured images had been stored. The processor 216 then processes the received captured images for determining one or more characteristics of one or more plants 126 of the plant stand 118. For example, in one embodiment of the invention, the processor 216 may execute image-processing code (i.e., software) stored in the memory 218 for determining one or more characteristics of one or more plants 126 of the plant stand 118, or even of the plant stand 118 itself. In the following description, characteristics of the plant stand 118 includes characteristics of the plants 126 of the plant stand 118.

By way of exemplary embodiments, the image processing code may include an image feature-detection code for processing the captured images, such as corner detection, blob detection, edge detection, or thresholding, and/or other known digital image feature detection means. If the captured image is not a digital image, the controller 208 may include means for digitizing the captured image. Such means are well known in the art.

The image processing code may also include image feature-position code for determining relative distances between features detected in the images (e.g., plant stems, leaves or other plant features), which may be further based on the settings (e.g., focal length, field of view) of the sensor unit 202 and/or height 120 of the sensor unit 202 above the surface 122 of the plant stand 118. Some methods associated with the image feature-position code may assume objects with known geometry (or fiducial markers) are present in the image. However, if dimensions associated with features of portions of the image are unknown, simultaneous localization and mapping (SLAM) algorithms may be employed to map relative distances. Mathematical methods used in the image feature-position code may include projective (epipolar) geometry, geometric algebra, rotation representation with exponential map, Kalman and particle filters, nonlinear optimization and robust statistics, or other commonly known mathematical techniques.

The image processing code may also include image plant-location code for determining the global coordinates (e.g., a GPS location) of the plants 126 detected in the processed images based further on GPS signals received from the GPS device 206 and a relative location of the corresponding sensor unit 202 with respect to the GPS device 206 (i.e., the coordinates of the sensor unit 202 with respect to the GPS device 206 being located at an origin of a coordinate system).

In another embodiment of the present invention, the captured image (or otherwise digitized captured image) includes pixels, and the processor 216 executes, either as part of the image processing code or as a separate program, image identification code that determines, by way of an exemplary embodiment, RGB intensity values for each pixel of the captured image for determining whether the pixel is a pixel of a plant image (i.e., a plant pixel). The processor 216 then processes only the pixels identified as plant pixels, according to one or more components of the above-described image processing code, for determining one or more characteristics of each of the plants 126 captured in the images of the plant stand 118. FIG. 4B shows the image 404, which is the result of the processor 216 processing the captured image 402 of FIG. 4A by executing one or more of the above-discussed codes of the image processing software.

In one embodiment of the present invention, the characteristics of a plant, as determined by the processor 216, include a morphology value, a position of the plant 126 in relation to positions of other plants 126 in the plant stand 118 (e.g., distances between plants and/or distances of plants to other objects or features, such as plant rows 128), and global coordinates (e.g., a GPS location) of the plant 126 in the plant stand 118. The morphology value may be based on one or more of the following features of a plant, including but not limited to, plant stem size, plant height, number of leaves of the plant, dimensions of one or more of the leaves, and a quantization of the overall shape of the plant 126. In one embodiment, a larger morphology value corresponds to a more mature plant and/or a healthier (i.e., more robust) plant.

In another embodiment of the invention, the characteristics of a plant stand, as determined by the processor 216, may include an absence of a plant from a plant row 128 (i.e., a missing plant). For example, the image processing code may determine that one or more plants are absent from a row, based on an analysis of a current image(s) in combination with expected distances between plants in given plant row, either from data entered by an operator or on statistical data generated from previously processed images, for example.

The image processing code also may determine distances between plants 126 and between plants 126 and any other objects of the captured image, based further on one or parameters of the sensor unit 202 and/or one or more parameters of the plant stand 118, including but not limited to, distances between the sensor unit 202 and the surface 122 of the plant stand 118, a field of view of the sensor unit 202 or other optical characteristics of the sensor unit 202, and dimensions of the plant stand (e.g., distances between adjacent rows of the plant stand 118).

In another embodiment of the invention, the memory 218 is configured to store features of an average plant of the plant stand 118. The features may be related to the morphology of an average or standard plant. An operator may enter features of an average plant based upon a visual survey of the plant stand 118, or the processor 216 may be configured to generate features of an average plant of the plant stand 118 (e.g., a running average) based upon features determined from previously captured and processed images, and thereafter stored in the memory 218. The processor 216 may then process a currently captured image for determining features of a given plant 126, and compare the determined features with the features of the average plant stored in memory 218 to generate a morphology value of the given plant 126.

For locating a plant within the plant stand 118, the GPS device 206 provides GPS signals to the controller 208. In addition, the memory 218 is configured to store relative locations of the corresponding sensor units 202 mounted to the agricultural vehicle 102 with respect to the GPS device 206 mounted to the agricultural vehicle 102. The processor 216 processes the captured images from the sensor unit 202, the GPS signals received from the GPS device 206, and the locations of the sensor units 202 mounted to the agricultural vehicle 102 relative to the GPS device 206 mounted to the agricultural vehicle 102 for determining a GPS location of each plant captured in the image. In another embodiment of the invention, if the GPS device 206 is not able to acquire GPS signals over some intervals of time, then the processor 216 uses the speed of the vehicle 102, acquired for example, from mechanical linkage and/or electrical circuitry coupled to the drive train (not shown) of the vehicle 102, the last GPS location of the GPS device 206 computed from the last received GPS signal, which may be stored in memory 218, the time lapse since the last received GPS signal, and the locations of the sensor units 202 mounted to the agricultural vehicle 102 relative to the GPS device 206 mounted to the agricultural vehicle 102, with the current processed image (or set of current processed images) to determine the GPS location of the plants in the currently processed images.

In one embodiment of the preset invention, the GPS locations of the plants 126 of the captured images of the plant stand 118 are stored in the memory 218, along with the other corresponding characteristics of each of the plants 126, such as morphology values and distances with respect to other plants and/or other objects.

In another embodiment of the present invention, the processor 216, after determining one or more characteristics of the plants 126 in the captured images, generates one or more control signals based on the determined characteristics and the locations of one or more applicators 204 mounted to the agricultural vehicle 102 relative to the GPS device 206 mounted to the agricultural vehicle 102, which may be stored in and acquired from the memory 218, and sends the control signals to the one or more of the applicators 204 for actuating one or more functions of the applicators 204 for performing an action on the plant stand 118, including actions on targeted plants of the plant stand 118.

According to one embodiment of the present invention, each applicator 204 includes at least one nozzle 220 coupled to at least one direction means 222. For example, the direction means 222 may be in the form of electric, hydraulic, or pneumatic controlled actuators, including levers, pistons, pins or other known devices which convert a control signal to motion, connected to the nozzle 220 for controlling the direction of the nozzle 220. The control signals may be based upon GPS locations of one or more targeted plants of the plant stand 118, as well as the locations of the applicators 204 relative to the GPS device 206, thereby enabling the direction means 222 to direct the nozzle 220 to point at a GPS location of a targeted plant by rotating and/or translating the nozzle.

In addition, each applicator 204 may be coupled to the storage unit 112, containing the agent 224, via at least one pump 226 and at least one actuator switch 228, such as an electric, hydraulic, or pneumatic controlled fluid switch. Although FIG. 3 shows the pump 226 not integrated with the applicator 204, the scope of the present invention covers a pump, e.g., pump 226, integrated with one or more of the applicators 204. In one embodiment, the actuator switch 228 receives one or more control signals for turning the switch off and on, thereby controlling a length of time that the switch remains open (i.e., open) for controlling an amount of agent to be applied to a targeted plant location. In one embodiment, the storage unit 112 contains a plant agent, such as an herbicide directed to kill the targeted plants of the plant stand 118, and the applicator 204 applies a determined dose of plant agent to the GPS locations of the targeted plants in the plant stand 118, as directed by the one or more control signals, which are generated if the morphology value of the plant is below a threshold morphology value (e.g., if the plant is statistically small or not robust (i.e., not healthy) with respect to a standard representative plant or with respect to average features of those plants 126 of the plant stand 118 whose images had been previously captured and processed), or a distance between the location of the plant and a location of another plant of the plant stand is below a plant separation threshold value (e.g., the plants are growing too close together), or a shortest distance between the location of the plant and a nearest row is greater than a row offset value (e.g., the plant is growing too far from the row in which it was intended to be planted).

In one embodiment of the invention, the plant agent is an herbicide designated to kill targeted plants, such as, for example, plants of the plant stand 118 that are growing too close together, or growing too far away from a plant row, or are morphologically inferior (e.g., below a predefined morphology standard for plants as input by an operator, or below a standard deviation of morphology values of plants previously imaged in the plant stand 118). However, the scope of the present invention covers all types of agents that have effects on plants and/or the plant stand, or on weeds of the plant stand, including but not limited to, pesticides, insecticides, fungicides, fertilizers, soil treatment agents, such as nitrogen, and even water.

In a further embodiment of the present invention, the processor 216 is configured to process the captured images for generating augmented reality (AR) images. Augmented reality is well-known to those of skill in the image-processing arts, the details of which will not be discussed here, except to mention that augmented reality includes processing techniques that augment real-world scenes by adding, subtracting, altering, and overlaying features to real-world images. FIG. 5 shows as an AR image 500, according to an embodiment of the present invention. The processor 216 may execute image processing code to augment the image of one or more plants of a group of plants that are growing too close to one another or are morphologically inferior and may augment the image of the plant stand 118 with symbols that represent missing plants (i.e., augment the image of target plants of the plant stand 118 and/or augment the image of the plant stand 118 itself). For example, when a distance between a location of a plant 502 and a location of a plant 504 is less than a predefined plant separation threshold value, the plants 502 and 504, one or both of which may be referred to as a target plant, are augmented with a predefined color. In this embodiment, the image of the plants 502 and 504 are colored green and outlined in red, represented by the diagonal left-to-right striping. In addition, the processor 216 may augment the image of a plant when a shortest distance between the location of the plant and the nearest row is greater than a predefined row offset value. For example, as illustrated, a plant 506 is offset by a distance d 508 from the row 128C (i.e., the shortest distance to the nearest row is the distance d to the row 128C), and thus the image of the plant 506 is colored green and outlined in blue, represented by the diagonal right-to-left striping. The processor 216 may augment the image of a plant when the plant's morphology, as quantized by its morphology value, is less than a predefined morphology value threshold. For example, the image of the plant 510 is augmented orange with a blue outline, represented by the vertical striping, since it's morphological value, based upon one or more of height, number of leaves, leaf dimensions, or stem diameter, or even based upon a quantization of its overall shape (e.g., does it conform to a standard appearance of a corn plant at a given stage in its development) is below a predefined morphology threshold value.

Furthermore, the processor 216 may be configured to show missing plants associated with any given plant row 128 by adding augmentations to the image of the plant stand 118 that represent missing plants. In an exemplary example, the image 500 is augmented with plant images 512 at corresponding locations, having bodies colored green and outlined in white, represented by the horizontal striping, which represent plants that are expected to be at these locations in the plant rows 128, based upon, for example, input from the user regarding crop planting statistics (e.g., seed separation, row spacings) and/or on average plant separation data gathered from previously processed images, but are absent (e.g., seeds were not planted at these locations, or seeds were planted, but did not germinate, or did germinate, but then succumbed to disease or environmental conditions). In addition, the processor 216 may execute the image processing code to augment the image of plants that are neither growing too close to one another nor are morphologically inferior, e.g., see augmented plant images 514 having bodies colored green and outlined in yellow (represented by the dotted pattern), thereby augmenting images of healthy, properly positioned plants.

Although the image 500 was augmented by colored images and/or symbols of the imaged plants, the scope of the invention covers any technique of differentiating and representing conditions of the plant stand 118, such as augmenting the images of the plant stand 118 with 2D maps of colored polygons or pixels, or projecting 3D features onto the image of the 2D plant stand 118.

In another embodiment of the present invention, the processor 216 may generate a first set of statistics associated with the plants 126 of the plant stand 118 based on captured and processed images. The first set of statistics may be based on the plant stand 118 as presently captured, before performing any action on the plant stand 118 and/or actions on targeted plants of the plant stand 118 by the applicator 204 (i.e., before managing the plant stand 118 via actions of the applicator 204). The first set of statistics may include predicted plant growth rates, predicted soil nutrient levels and predicted plant stand (i.e., crop) yields based upon, for example, the number of plants detected in the plant stand, the morphology of the plants, the distances between plants and plant rows, and/or the global locations of the plants of the plant stand. In one embodiment of the present invention, the processor 216 generates the first set of statistics from the AR images.

The processor 216 may generate a second set of statistics associated with the plants 126 of the plant stand 118 based on the captured and processed images, and further based upon the expected changes to the plant stand 118 after performing, by the applicator 204, actions to targeted plants and/or the plant stand 118. For example, the second set of statistics may include predicted plant growth rates, predicted soil nutrient levels and predicted plant stand yields based upon application of the agent 224 by the applicator 204 to target plants, e.g., plants 504, 506, 512, to eliminate plants growing too close together, or too far away from a designated row, or having undeveloped morphologies (low morphology values, for example). In one embodiment of the present invention, the processor modifies the AR images based upon the expected changes to the plant stand 118 after performing, by the applicator 204, actions to targeted plants and/or the plant stand 118, and then generates the second set of the statistics from the modified AR images. The controller 208 may be configured to store the first and second sets of statistics, as well as AR images, e.g., AR image 500 or spliced-together AR images depicting an agricultural field of which the plant stand 118 is a portion, for future display and/or further analysis.

In one embodiment of the present invention, the plant stand management system 200 comprises an optional display 230 (FIG. 3). The display 230 and the controller 208 may be integral components of a PC, a PDA, a laptop, or a smart phone, or the display 230 may be coupled to the controller 208 wirelessly or via cables 232, such as Ethernet cables, and may be mounted to the vehicle 102, for example to the cab 110 of the vehicle 102.

Figure 6:
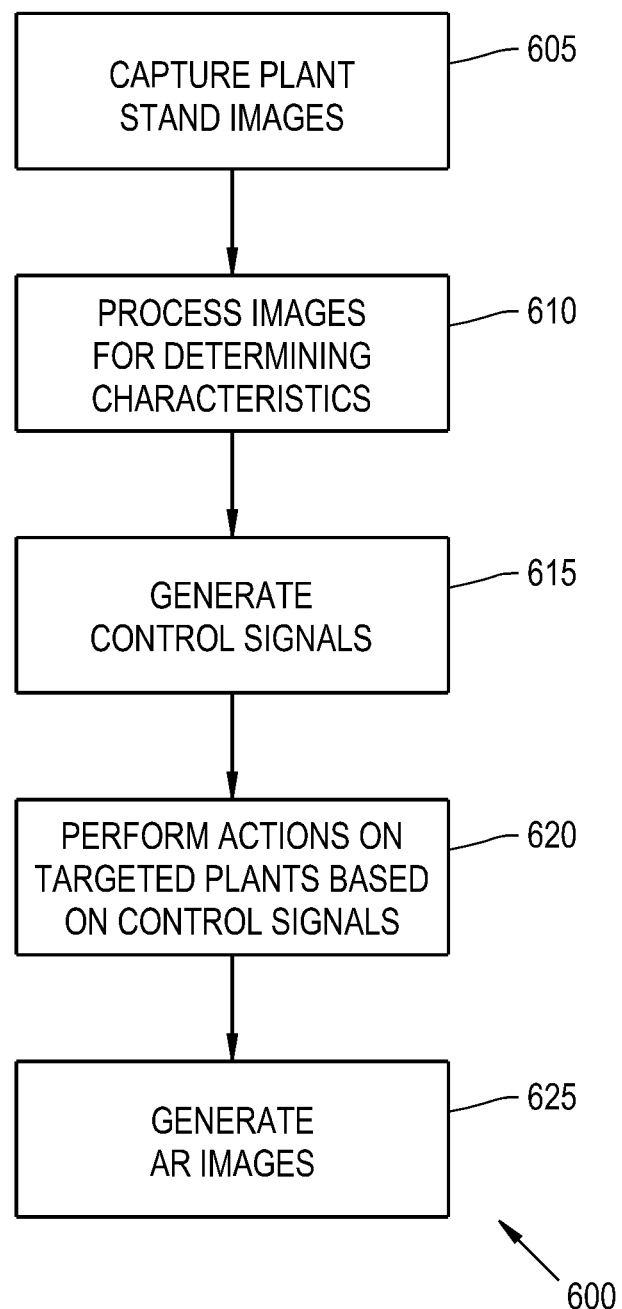
FIG. 6 is a flow chart illustrating an exemplary method performed by the plant management system of FIG. 3, formed in accordance with an embodiment of the present invention.

FIG. 6 is a flow chart illustrating a plant stand management method 600, according to an embodiment of the present invention. In step 605, images of a plant stand are captured. In one embodiment, one or more sensor units 202 captures images of the plants 126 of the plant stand 118. The sensor unit 202 may be a high-speed digital camera. In one embodiment, one or more of the sensor units 202 may be mounted to an agricultural vehicle 102, including mounting the sensor units 202 to an adjustable boom 116 of the vehicle 102. As the vehicle 102 travels across the plant stand 118, parallel to rows 128 of the plants 126, the sensor unit 202 is configured to capture a series of images. Each sensor unit 202 may be configured to capture the images in a direction parallel to the rows 128, in a direction perpendicular to the rows 128 or in any predefined angle with respect to a direction of the rows 128. In one embodiment, each sensor unit 202 may be configured to simultaneously capture a series of pairs of images, each pair including one image taken in a first direction perpendicular to a row and a second image taken in a second direction 180° from the first direction.

In step 610, the captured images are processed for determining one or more characteristics of the plant stand 118, including one or more characteristics of one or more plants 126 of the plant stand 118. The one or more characteristics of each plant 126 may include a morphology value, a position of the plant 126 relative to positions of other plants 126 in the plant stand 118 (e.g., distances between plants and/or distances of plants to other objects or features, such as plant rows, also referred to as relative distances of plants in the captured images), and a global location (e.g., GPS coordinates) of the plant 126 in the plant stand 118. The morphology value may be based on at least one of the following features of a plant, such as plant stem size, plant height, number of leaves of the plant, dimensions of one or more of the leaves, and overall shape of the plant.

In one embodiment of the present invention, a processor 216 applies imaging processing software to the captured images, including image feature-detection code including corner detection, blob detection, edge detection, or thresholding, or other known image processing algorithms for determining features of plants detected in the captured images and computing a morphology value for each plant based upon one or more of its associated features, and/or image feature-position code for determining relative distances between features detected in the images (e.g., plant stems, leaves or other plant features), which may be further based on the settings and/or position of the sensor unit 202 relative to the surface 122 of the plant stand 118, and/or plant-location code for determining the global coordinates (e.g., GPS location) of the plants 126 detected in the images based further on GPS signals received from the GPS device 206 and relative positions of the sensor unit 202 with respect to a position of the GPS device 206.

In another embodiment of the present invention, the processor 216 applies RGB image identification software to the captured images for determining whether a pixel of the image belongs to a plant, based on its RGB value, and the processor 216 then applies one or more of the above-described image feature-detection code, image feature-position code and plant-location code only to those pixels of the captured image that are identified as plant pixels.

In step 615, for those plants detected in the captured images having one or more determined characteristics meeting specifically predefined characteristics, where such detected plants are referred to as targeted plants, one or more associated control signals are generated. For example, one or more control signals associated with a plant (i.e. a targeted plant) may be generated when the morphology value of the plant is below a threshold morphology value, a distance between the plant and another plant is less than a plant distance threshold value, and/or a shortest distance between the plant and a nearest row is greater than a row threshold value.

In step 620, one or more actions are performed on the targeted plants of the plant stand 118 based upon the control signals generated in association with the targeted plants. In one embodiment, one or more of the control signals generated in association with the targeted plant are received by an applicator 204, and in an exemplary embodiment, by actuators 222, 228 of the applicator 204.

In one embodiment of the present invention, one or more of the applicators 204 may be mounted to an agricultural vehicle 102, including mounting the applicators 204 to an adjustable boom 116 of the vehicle 102. As the vehicle 102 travels across the plant stand 118, parallel to rows 128 of plants 126, the applicator 204 is configured to perform one or more actions on targeted plants of the plant stand 118. In one embodiment, each of the applicators 204 and sensor units 202 are mounted to the boom 116 in such a manner that either each applicator 204 is above a row 128 when each sensor unit 202 is between adjacent rows, or each applicator 204 is above a row 128 when each sensor unit 202 is also above a row 128, although the scope of the invention covers other mounting arrangements, based upon plant size and spacing between rows, for example. In one embodiment, each sensor unit 202 is mounted to the boom 116 in a position that is nearer the front portion 106 of the vehicle 102 than a position on the boom 116 to which each applicator 204 is mounted.

In an exemplary embodiment of the present invention, each applicator 204 comprises one or more nozzles 220 coupled to at least one directional means 222, such as one or more directional actuators configured for receiving positioning control signals, such as electrical, pneumonic, or hydrolytic positioning control signals, that cause the nozzle 220 to rotate and/or translate for directing the agent 224 to a global location (e.g., a GPS location) of a targeted plant. Each applicator 204 may also include an actuator fluid switch or fluid valve 228 configured to receive one or more switching control signals for opening and/or closing the switch 228, thereby coupling the nozzle 220 to storage container 112 containing the plant agent 224 via the switch 228 and a pump 226.

In one embodiment of the present invention, when a plant is targeted because of distance to a neighboring plant, distance from its designated plant row, or morphology value, control signals are generated and received by the fluid valve 228 and positioning actuators 222 of the applicator 204 associated with the particular sensor unit 202 from which the targeted plant was imaged (e.g., the applicator mounted closest to the particular sensor unit) to cause the applicator 204 to apply, via a nozzle 220, an herbicide to the GPS location of the targeted plant for a certain length of time in order to kill the plant. The length of time that the fluid valve 228 remains open to deliver a dose of the agent may depend upon the type of agent applied, the present environmental conditions (windy, wet, dry, cold, hot, etc.) and the size or morphological development of the plant.

In another embodiment of the present invention, the agent 224 is a fertilizer or water, and the targeted plants are malnourished or water-deprived plants. In yet another embodiment, all the plants 126 of the plant stand 118 are targeted, if, for example, each of these plants (or some predefined number of these plants) are underdeveloped, based upon the determined morphology values, for example, and thus a plurality of applicators 204 are activated to apply the appropriate agent 224 to the entire plant stand 118.

In step 625, the processed captured images are further processed for generating augmented reality (AR) images. For example, when a distance between a plant and another plant is below a predefined plant distance threshold value, the image processing software of the processor 216 is configured to apply an augmentation to the representation of one or both of the plants in the image, for example, by outlining the representations of the plants with a particular color, or by replacing the representation of one or both of the plants with a geometric figure or symbol that would represent plants growing too close together in the corresponding location of the plant stand 118. Similarly, the image processing software of the processor 216 may apply other augmentations to representations of plants 126 in the image, or to the image of the plant stand 118, when, for example, a shortest distance between a plant and a closest plant row is greater than a predetermined plant row distance threshold value, a morphology value of a plant is below a threshold morphology value, or locations in a plant row 128 at which a plant is to be expected, but is absent.

In one embodiment of the present invention, the processor 216 executes a two-step imaging process, generating first processed images based upon the captured images, as illustrated in FIG. 4B, from which the one or more characteristics of each plant 126 may be determined, and then generating second processed images (e.g., the AR images) based on the first processed images, which are particularly useful in presenting time-lapsed displays of the plant stand 118, based upon images captured at different times during the growing season. In this manner, an operator may determine and illustrate (via the display 230, for example) the effectiveness of applying, via the applicator 204, different agents 224 on the development of the plant stand 118 and on the changes to the predicted yield as a result of applying the agent 224 as compared to the predicted yield if the agent 224 had not been applied.

In another embodiment of the present invention, the processor 216 executes a single-step imaging process, generating AR images based upon the captured images, as illustrated in FIG. 5, from which the one or more characteristics of each plant 126 may be determined and illustrated, via the display 230, for example, for presenting time-lapsed statistics and/or maps of the plant stand 118 during the growing season, up until harvest.

Figure 7:
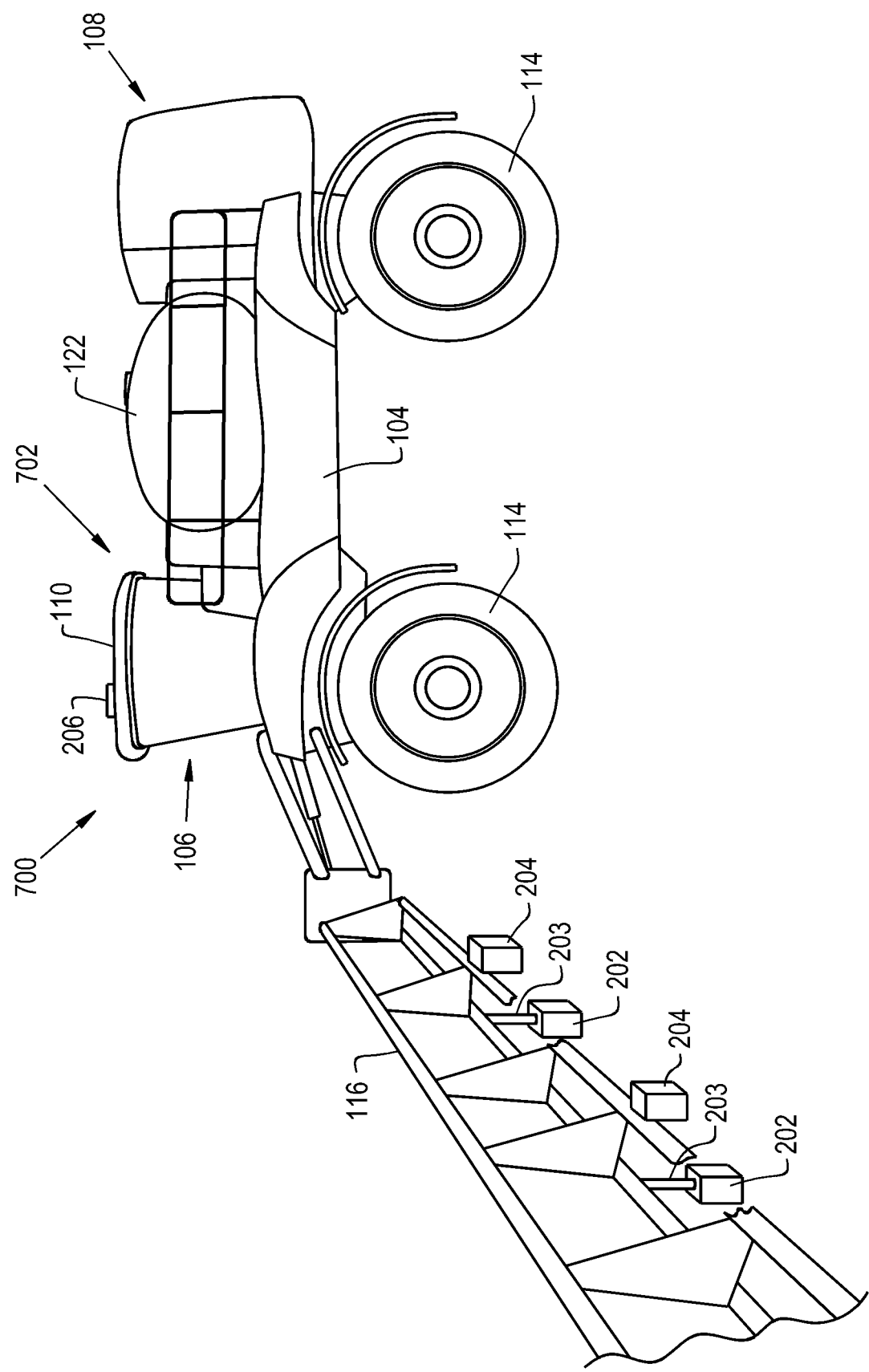
FIG. 7 is a perspective view of a system including an agricultural vehicle and a plant management system, formed in accordance with another embodiment of the present invention.

FIG. 7 illustrates a system 700 formed in accordance with another embodiment of the present invention. The system 700 includes an agricultural vehicle 702. The reference numbers that are the same as the reference numbers of the previous figures designate identical features. The vehicle 702 includes a chassis 104 having a front portion 106 and a back portion 108. The vehicle 702 includes a cab 110 mounted to the chassis 104, a storage container 112 mounted to the chassis 104, and wheels 114 mounted to the chassis 104. In the embodiment shown, the vehicle 102 also includes a boom 116 mounted to the front portion 106 of the chassis 104. In one embodiment of the invention, the boom 116 is a conventional boom used in conjunction with applying agents, such as herbicides, pesticides, insecticides, fungicides and fertilizers, to a plant stand 118.

The system 700 also includes a plant stand management system 200 mounted to the agricultural vehicle 702. The plant stand management system 200 includes at least one sensor unit 202 mounted to the boom 116, at least one applicator 204 mounted to the boom 116, at least one optional GPS device 206 mounted to the cab 110, and a controller 208 mounted to the cab 110. The controller 208 is communicatively coupled to the sensor unit 202, the applicator 204, and the GPS device 206 via cables 210, 212, 214, such as Ethernet coaxial cables forming a LAN, or wirelessly via a WLAN, for example.

Figure 8:
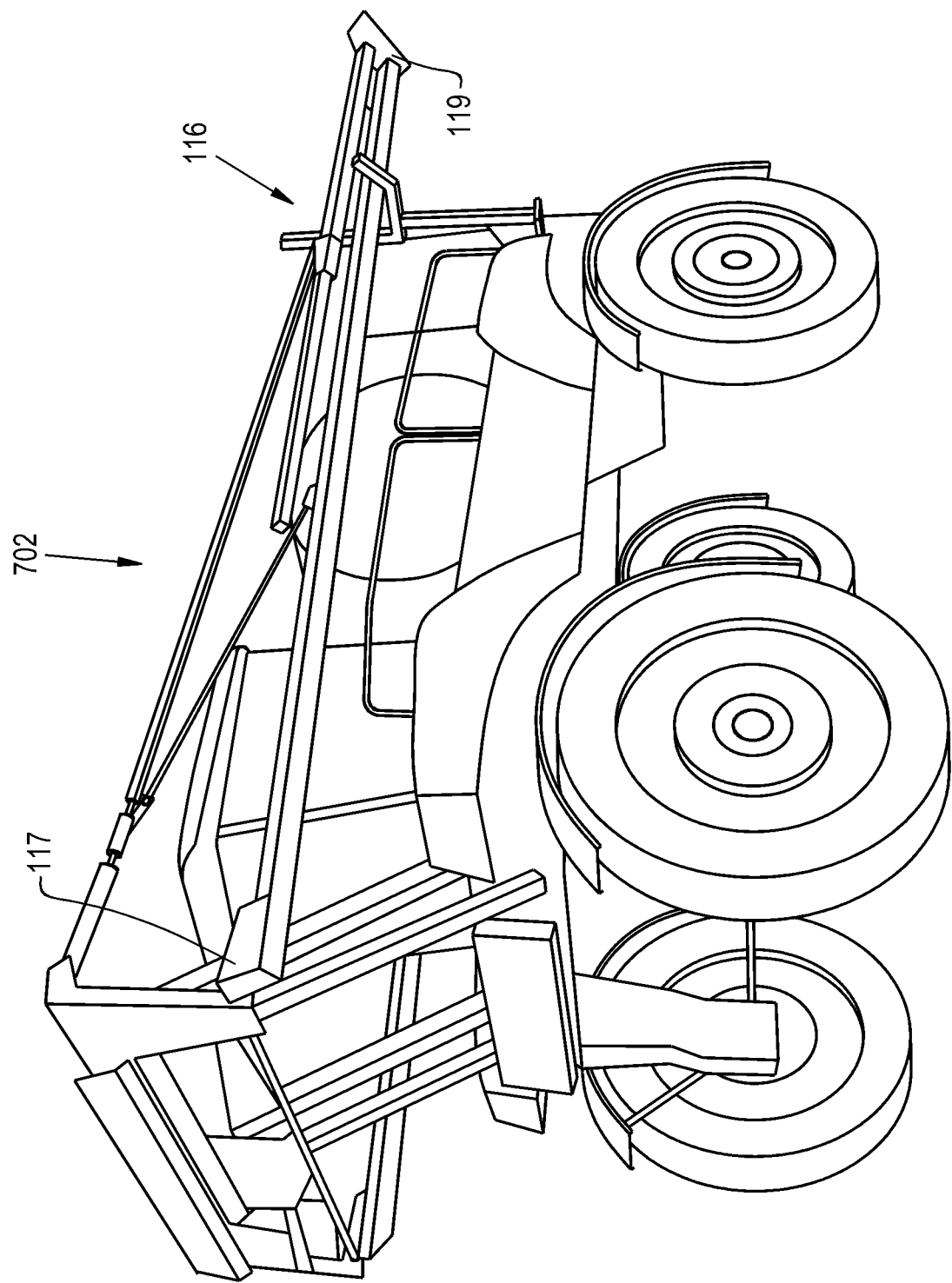
FIG. 8 is a perspective view of the agricultural vehicle of FIG. 7 with the boom folded, according to an embodiment of the present invention.

As shown, the sensor units 202 are mounted forward of the applicators 204. The sensor units 202 may be mounted to the boom 116 via attachment means 203, such as arms. The attachments means 203 are rotatably attached to the boom 116, thereby allowing the sensor units 202 and the attachment means 203 to be rotated into a position parallel to, or in plane with, a longitudinal axis of the boom 116 to facilitate storage of the sensor units 202, particularly when not in use, and/or to facilitate the boom 116 to be folded to facilitate storage of the vehicle 702, transport of the vehicle 702, and maneuverability of the vehicle 702. FIG. 8 illustrates the vehicle 702 with the boom 116 folded. For example, in one embodiment of the present invention, each half of the boom 116 may be folded at two points 117 and 119, although the scope of the invention covers all configurations of foldable booms. For ease of illustration, the sensor units 202, the attachment means 203 and the applicators 204 are not shown in FIG. 8.

It is to be understood that the steps of the method 600 are performed by their respective controller 208 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 208 described herein, such as the method 600, is implemented in software code or instructions which are tangibly stored on a tangible computer readable medium. Upon loading and executing such software code or instructions by the controller 208, the controller 208 may perform any of the functionality of the controller 208 described herein, including any steps of the method 600 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system, comprising:
an agricultural vehicle; and
a plant stand management system mounted to said agricultural vehicle, including:
at least one sensor unit configured to capture images of a plant stand;
at least one applicator;
a controller communicatively coupled to said at least one sensor unit and said at least one applicator, said controlled configured to:
receive said captured images;
process said captured images for determining one or more characteristics of said plant stand;
generate one or more control signals based on said one or more characteristics; and
send said one or more control signals to said at least one applicator,
wherein said at least one applicator is configured to perform at least one action on said plant stand based on said one or more control signals,
wherein said plant stand management system further comprises a GPS device mounted to said agricultural vehicle, wherein said GPS device is communicatively coupled to said controller,
wherein said controller is configured to receive GPS signals from said GPS device, and
wherein said controller comprises:
a memory for storing image processing software, and a location of said at least one sensor unit mounted to said agricultural vehicle and a location of said at least one applicator mounted to said agricultural vehicle relative to said GPS device mounted to said agricultural vehicle; and
a processor configured to execute said image processing in software for processing said captured images for determining said one or more characteristics of said plant stand,
wherein said plant stand comprises one or more plants, said one or more plants associated with one or more rows,
wherein said one or more characteristics of said plant stand comprises at least one of a morphology value of said one or more plants, distances between said one or more plants, distances between said one or more plants and one or more features of said plant stand, a global location of said one or more plants, and missing plants, and
wherein said processor is configured to execute said image processing software for processing said captured images, said GPS signals from said GPS device, and said location of said at least one sensor unit mounted to said agricultural vehicle relative to said GPS device mounted to said agricultural vehicle for determining said global location of said one or more plants.

2. The system according to claim 1, wherein said plant stand is a corn plant stand.

3. The system according to claim 1, wherein said plant stand comprises one or more plants, said one or more plants associated with one or more rows, and wherein said one or more characteristics of said plant stand comprises at least one of a morphology value of said one or more plants, distances between said one or more plants, distances between said one or more plants and one or more features of said plant stand, a global location of said one or more plants, and missing plants.

4. The system according to claim 3, wherein said at least one applicator comprises at least one nozzle coupled to at least one direction means and at least one fluid switch, said at least one fluid switch coupled to a storage unit via at least one pump, said at least one direction means configured to receive one or more positioning control signals and said at least one fluid switch configured to receive one or more switching control signals, said storage unit containing an agent, and wherein said at least one nozzle is configured to direct a dose of said agent to said global location of a plant in said plant stand if at least one of said morphology value of said plant is below a threshold morphology value, a distance between said plant and another plant of said plant stand is below a plant separation threshold value, and a shortest distance between said plant and a nearest row is greater than a row offset value.

5. The system according to claim 4, wherein said morphology value is based upon at least one of stem size of said plant, height of said plant, number of leaves of said plant, and dimensions of one or more of said leaves.

6. The system according to claim 4, wherein said agent is an herbicide configured to kill said plant.

7. The system according to claim 4, wherein said agent is a fertilizer.

8. The system according to claim 4, wherein said direction means comprises one or more of at least one of an electric-controlled actuator, a hydraulic-controlled actuator, and a pneumatic-controlled actuator.

9. The system according to claim 1, wherein said at least one sensor unit is at least one camera, and wherein said processor is further configured to use at least one of a distance between said at least one camera and a surface of said plant stand, a field of view of said at least one camera, and a distance between adjacent rows of said plant stand for determining said one or more characteristics of said plant stand.

10. The system according to claim 1, wherein said memory is configured to store one or more features of an average plant of said plant stand, wherein said processor is further configured to execute said image processing software for processing said captured images for determining one or more features of said one or more plants and comparing said one or more determined features with said one or more features of said average plant for determining said morphology value of said one or more plants.

11. The system according to claim 10, wherein said one or more features comprise at least one of stem size, height, number of leaves and dimensions of one or more of said leaves.

12. The system according to claim 1, wherein said processor is further configured to execute said image processing software for processing said captured images for generating augmented reality (AR) images, said AR images differentially augmented based on one or more of said morphology value of said one or more plants, said distances between said one or more plants, said distances between said one or more plants and one or more features of said plant stand, and said missing plants.

13. The system according to claim 12, wherein said processor is further configured to modify said AR images based upon modification of said plant stand, said modification of said plant stand based upon said at least one applicator performing said at least one action on said plant stand, generate first statistics from said AR images and second statistics from said modified AR images, and store said first and second statistics in said memory.

14. The system according to claim 13, wherein said first and second statistics comprise first and second yields of said plant stand.

15. The system according to claim 12, wherein said plant stand management system further comprises a display mounted to said agricultural vehicle, said display communicatively coupled to said controller, said display configured to display said AR images.

16. The system according to claim 1, wherein each captured image of said captured images comprises a plurality of pixels, and wherein said controller is further configured to process said each captured image by determining RGB intensity values of each pixel of said plurality of pixels for determining if said each pixel is a plant pixel, and wherein said controller is configured to process only said determined plant pixels of said each image for determining said one or more characteristics of said plant stand.

17. The system according to claim 1, wherein said plant stand comprises one or more plants, said one or more plants associated with one or more rows, and wherein said agricultural vehicle comprises a boom, said boom mounted to a front portion of said vehicle or a back portion of said vehicle, a height of said boom above a surface of said plant stand being adjustable, and wherein each sensor unit of said at least one sensor unit and each applicator of said at least one applicator are mounted on said boom such that said each sensor unit is positioned between adjacent rows of said plant stand when said each applicator is positioned above a row of said plant stand.

18. The system according to claim 17, wherein said each sensor unit is configured to capture images in at least one direction perpendicular to said one or more rows of said plant stand.

19. A plant stand management system for use in an agricultural vehicle traversing a plant stand, comprising:
   at least one sensor unit configured to capture images of said plant stand;
   at least one applicator; and
   a controller electrically coupled to said at least one sensor unit and said at least one applicator, said controlled configured to:
      receive said captured images;
      process said captured images for determining one or more characteristics of said plant stand;
      generate one or more control signals based on said one or more characteristics; and
      send said one or more control signals to said at least one applicator,
   wherein said at least one applicator is configured to perform at least one action on said plant stand based on said one or more control signals,
   wherein said plant stand management system further comprises a GPS device, wherein said GPS device is communicatively coupled to said controller, wherein said controller is configured to receive GPS signals from said GPS device, and wherein said controller comprises:
      a memory for storing image processing software, and a location of said at least one sensor unit and a location of said at least one applicator relative to said GPS; and
      a processor configured to execute said image processing software for processing said captured images for determining said one or more characteristics of said plant stand,
   wherein said plant stand comprises one or more plants, said one or more plants associated with one or more rows, and wherein
   said one or more characteristics of said plant stand comprises at least one of a morphology value of said one or more plants, distances between said one or more plants, distances between said one or more plants and one or more features of said plant stand, a global location of said one or more plants, and missing plants, and wherein said processor is configured to execute said image processing software for processing said captured images, said GPS signals from said GPS device, and said location of said at least one sensor unit relative to said GPS device for determining said global location of said one or more plants.

20. The system according to claim 19, wherein said plant stand comprises one or more plants, said one or more plants associated with one or more rows, and wherein said one or more characteristics of said plant stand comprises at least one of a morphology value of said one or more plants, distances between said one or more plants, distances between said one or more plants and one or more features of said plant stand, a global location of said one or more plants, and missing plants.

21. The system according to claim 20, wherein said at least one applicator comprises at least one nozzle coupled to at least one direction means and at least one fluid switch, said at least one fluid switch coupled to a storage unit via at least one pump, said at least one direction means configured to receive one or more positioning control signals and said at least one fluid switch configured to receive one or more switching control signals, said storage unit containing an agent, and wherein said at least one nozzle is configured to direct a dose of said agent to said global location of a plant in said plant stand if at least one of said morphology value of said plant is below a threshold morphology value, a distance between said plant and another plant of said plant stand is below a plant separation threshold value, and a shortest distance between said plant and a nearest row is greater than a row offset value.

22. The system according to claim 21, wherein said morphology value is based upon at least one of stem size of said plant, height of said plant, number of leaves of said plant, and dimensions of one or more of said leaves.

23. The system according to claim 19, wherein said at least one sensor unit is at least one camera, and wherein said processor is further configured to use at least one of a distance between said at least one camera and a surface of said plant stand, a field of view of said at least one camera, and a distance between adjacent rows of said plant stand for determining said one or more characteristics of said plant stand.

24. The system according to claim 19, wherein said processor is further configured to execute said image processing software for processing said captured images for generating augmented reality (AR) images, said AR images differentially augmented based on one or more of said morphology value of said one or more plants, said distances between said one or more plants, said distances between said one or more plants and one or more features of said plant stand, and said missing plants.

25. The system according to claim 24, wherein said processor is further configured to modify said AR images based upon modification of said plant stand, said modification of said plant stand based upon said at least one applicator performing said at least one action on said plant stand, generate first statistics from said AR images and second statistics from said modified AR images, and store said first and second statistics in said memory.

26. The system according to claim 24, wherein said plant stand management system further comprises a display, said display communicatively coupled to said controller, said display configured to display said AR images.

27. The system according to claim 19, wherein each captured image of said captured images comprises a plurality of pixels, and wherein said controller is further configured to process said each captured image by determining RGB intensity values of each pixel of said plurality of pixels for determining if said each pixel is a plant pixel, and wherein said controller is configured to process only said determined plant pixels of said each image for determining said one or more characteristics of said plant stand.

* * * * *